United States Patent [19]
Barrett et al.

[11] Patent Number: 6,162,126
[45] Date of Patent: Dec. 19, 2000

[54] UNIVERSAL JOINT

[75] Inventors: Mark S. Barrett, Orion; Robert B. Horton, Sturgis; Larry L. Cramer, deceased, late of Augres, all of Mich., by Suzanne M. Cramer, executor

[73] Assignee: American Axle & Manufacturing, Inc., Detroit, Mich.

[21] Appl. No.: 09/189,886

[22] Filed: Nov. 11, 1998

Related U.S. Application Data

[60] Provisional application No. 60/071,170, Jan. 12, 1998.

[51] Int. Cl.$^7$ ........................................................ F16D 3/16
[52] U.S. Cl. ........................... 464/134; 464/136; 403/281
[58] Field of Search ................................... 403/281, 279; 464/134, 136

[56] References Cited

U.S. PATENT DOCUMENTS

| | | |
|---|---|---|
| 3,062,026 | 11/1962 | Pitner . |
| 3,178,907 | 4/1965 | Lyons . |
| 3,589,143 | 6/1971 | Batt et al. ................ 464/130 |
| 3,701,189 | 10/1972 | Kadono et al. . |
| 3,986,238 | 10/1976 | Fisher . |
| 4,000,628 | 1/1977 | Funatani et al. . |
| 4,365,488 | 12/1982 | Mochida et al. ........... 464/132 |
| 4,704,782 | 11/1987 | Spiess et al. . |
| 5,417,613 | 5/1995 | Aiken ....................... 464/130 |
| 5,697,849 | 12/1997 | Culp ........................ 464/112 |
| 5,715,600 | 2/1998 | Marriott et al. ........... 464/130 |
| 5,797,800 | 8/1998 | Rhoades et al. . |

*Primary Examiner*—Lynne H. Browne
*Assistant Examiner*—Aaron M. Dunwoody
*Attorney, Agent, or Firm*—Harness, Dickey & Pierce, P.L.C.

[57] ABSTRACT

A universal joint for interconnecting a pair of rotating shafts and a method of assembling the universal joint. The universal joint includes a pair of yokes secured to the shafts and a cruciform for interconnecting the yokes. Both yokes are bifurcated to define a pair of laterally-spaced legs. Each leg has an aperture which includes a first bore adapted to receive a bearing cup therein and a second bore into which an end portion of the bearing cup extends. Each bearing cup rotatably supports one of four orthogonal trunions extending from the cruciform. With respect to each of the yokes, a pair of axially-aligned trunions, with bearing cups mounted thereon, are installed into the apertures so as to support the cruciform between the legs of the yoke. Thereafter, a retention member is inserted in the second bore of each aperture such that one surface of the retention member rests on the bearing cup. After the rotary axis of the first shaft is aligned with the rotary axis of the second shaft, an edge portion of the legs surrounding the second bore of each aperture is deformed to define one or more projections which engage the opposite surface of the retention member. The projections secure the retention members within the second bore of the apertures, thereby fixing the axial position of the bearing cups and trunions relative to the yoke.

37 Claims, 5 Drawing Sheets

1

UNIVERSAL JOINT

CROSS-REFERENCE TO RELATED APPLICATION

This application is based upon and claims priority to U.S. Provisional Patent Application Serial No. 60/071,170 filed Jan. 12, 1998, and entitled Universal Joint, the specification and drawings of which are herein expressly incorporated by reference.

BACKGROUND OF THE INVENTION

The present invention relates to universal joints for use in the driveline of a motor vehicle. In addition, the present invention relates to a method for assembling universal joints.

As is well known, universal joints are used in motor vehicle driveline applications for interconnecting a pair of rotary shafts and permitting changes in the angularity therebetween. Most conventional universal joints include a pair of bifurcated yokes which are secured to the shafts and which are interconnected by a spider or cruciform for rotation about independent axes. The cruciform includes four orthogonal trunions with each opposing pair of axially aligned trunions mounted in a pair of aligned bores formed in the bifurcated yokes. Typically, a bearing cup is secured in each bore and a bearing assembly is retained in the bearing cup such that each yoke is supported for pivotal movement relative to a pair of trunions.

Although it is known that misalignment of the rotary axes of the rotating shafts may result in a unbalanced universal joint, various retention methods have been developed for securing the bearing cups to the yokes in a manner wherein the rotary axis of each yoke is aligned centrally with respect to the rotary axis of the cruciform. Traditional bearing cup retention methods include the use of grooves and snap rings, plastic injection and staking. However, each method has one or more disadvantages such as, for example, excessive machining requirements, limited serviceability, and the inability to compensate for tolerance variations of the components. In particular, one type of conventional universal joint utilizes snap rings which are seated in circumferential grooves machined into the bores formed in the yokes for axially positioning the bearing cups. However, in determining the desired location of the grooves, the sum of each component's dimensional variation (i.e., stack-up) must be taken into consideration. As such, a compromise occurs between the allowable manufacturing tolerances of the individual components and the desired component alignment. Other universal joints attempt to compensate for dimensional variations in the components but sacrifice serviceability. Specifically, the plastic injection processes is well-suited for use in production assembly environments but is impractical for servicing universal joints in the field. Several examples of bearing cup retention arrangements and methods associated with conventional universal joints are disclosed in U.S. Pat. Nos. 3,062,026, 3,178,907, 3,701,189, 3,986,238, 4,000,628, 4,310,206 and 4,704,782.

SUMMARY OF THE INVENTION

Accordingly, the present invention is directed to overcoming the disadvantages commonly associated with the manufacture and subsequent service of conventional universal joints. Therefore, it is an object of the present invention to provide a method for assembling a universal joint which compensates for individual part tolerances while satisfying the requirements for component alignment and easy serviceability.

It is another object of the present invention to provide a universal joint manufactured utilizing the above-mentioned assembly method.

The present invention is directed to a universal joint for interconnecting a pair of rotating shafts and a method of assembling the universal joint. The universal joint includes a pair of yokes secured to the shafts and a cruciform for interconnecting the yokes. Both yokes are bifurcated to define a pair of laterally-spaced legs. Each leg has an aperture which includes a first bore adapted to receive a bearing cup therein and a second bore into which an end portion of the bearing cup extends. Each bearing cup rotatably supports one of four orthogonal trunions extending from the cruciform. With respect to each of the yokes, a pair of axially-aligned trunions, with bearing cups mounted thereon, are installed into the apertures so as to support the cruciform between the legs of the yoke. Thereafter, a retention member is inserted in the second bore of each aperture such that one surface of the retention member rests on the bearing cup. After the rotary axis of the first shaft is aligned with the rotary axis of the second shaft, an edge portion of the legs surrounding the second bore of each aperture is deformed to define one or more projections which engage the opposite surface of the retention member. The projections secure the retention members within the second bore of the apertures, thereby fixing the axial position of the bearing cups and trunions relative to the yoke.

According to another feature of the present invention, the retention members are snap rings. Since the projections extend radially so as to define a retention aperture, the snap rings can be elastically collapsed to permit easy removal of the snap rings and the bearing cups for servicing.

Further areas of applicability of the present invention will become apparent from the detailed description provided hereinafter. It should be understood however that the detailed description and specific examples, while indicating preferred embodiments of the invention, are intended for purposes of illustration only since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

In general, the present invention is directed to a universal joint of the type used in motor vehicle driveline applications for interconnecting rotating shafts in a manner permitting changes in angularity therebetween. The present invention is also directed to a method for assembling the universal joint which compensates for individual part tolerances while maintaining accurate component alignment.

Figure 3:
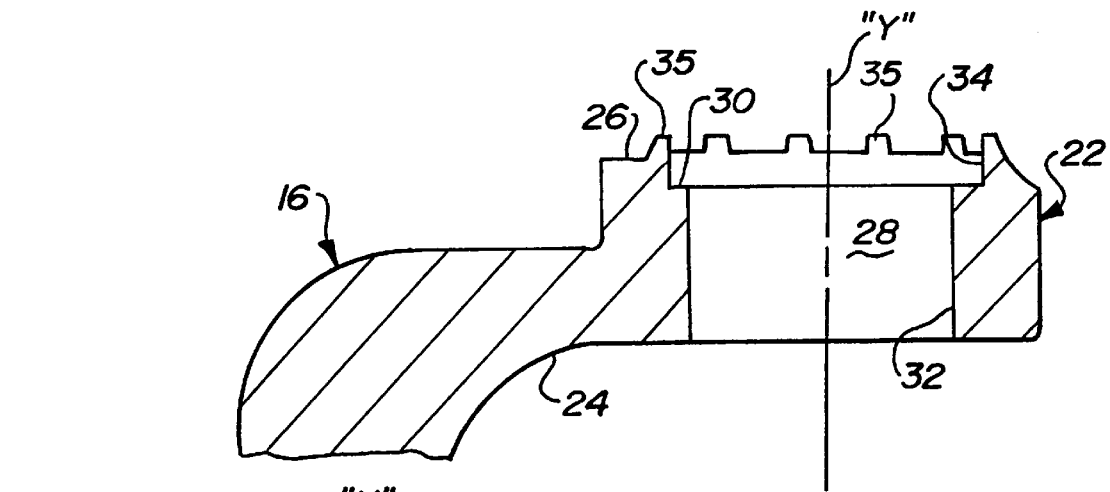
FIGS. 3 and 3A are partial sectional views of one of the yokes associated with the universal joint shown in FIGS. 1 and 2.
Figure 3A:
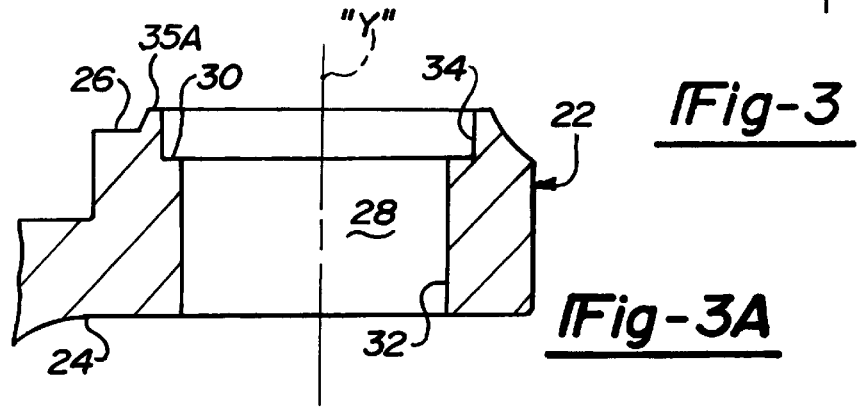

Referring to the drawings, a universal joint 10 is shown connecting a first shaft 12 to a second shaft 14. In general, universal joint 10 includes a first yoke 16 attached to an end of first shaft 12, a second yoke 18 attached to an end of second shaft 14, and a cruciform 20 interconnecting first yoke 16 to second yoke 18. First yoke 16 is bifurcated and includes a pair of laterally-spaced legs 22 which are preferably symmetrical with respect to the rotary axis of first shaft 12, as denoted by construction line "A". Legs 22 includes an inboard surface 24 and an outboard surface 26 with an aperture 28 extending therebetween. Apertures 28 are aligned on a first trunion axis, as denoted by construction line "Y", which passes through and is orthogonal with respect to rotary axis "A" of first shaft 12. As best seen from FIG. 3, each aperture 28 is a throughbore and includes a stepped shoulder portion 30 formed between a smaller diameter first bore 32 and a larger diameter second bore 34. Legs 22 also include a series of upstanding lugs 35 formed adjacent to the edge of second bore 34. Alternatively, legs 22 could include an upstanding annular rim segment 35A formed adjacent to the edge of second bore 34, as is shown in FIG. 3A. In either case, lugs 35 and rim segment 35A are formed to be generally concentric with trunion axis "Y" so as to surround second bore 34 of apertures 28.

Figure 4:
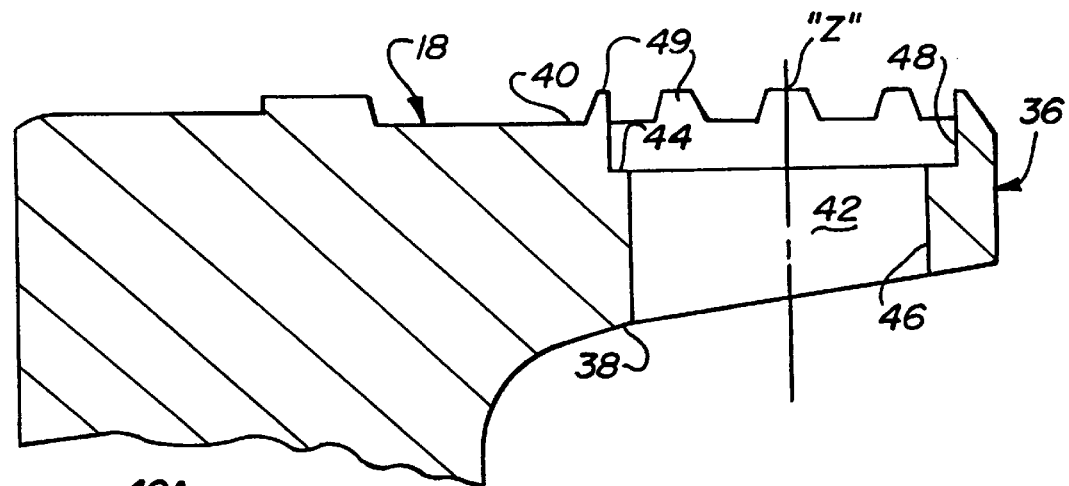
FIGS. 4 and 4A are partial sectional views of the other yoke associated with the universal joint shown in FIGS. 1 and 2.
Figure 4A:
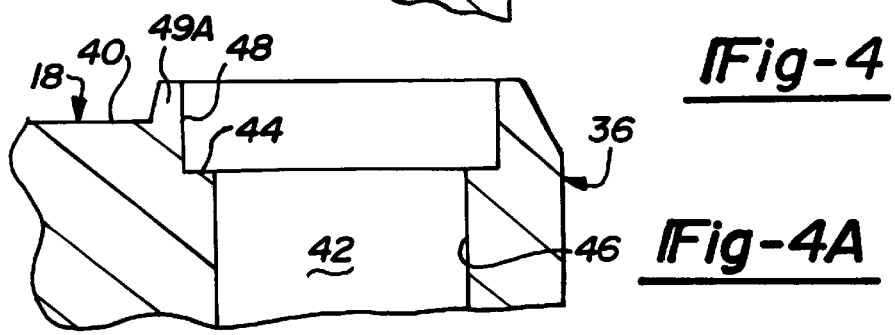

Second yoke 18 is bifurcated and includes a pair of laterally-spaced legs 36 which are preferably symmetrical with respect to the rotary axis of second shaft 14, as denoted by construction line "B". Legs 36 include an inboard surface 38 and an outboard surface 40 with an aperture 42 extending therebetween. Apertures 42 are aligned on a second trunion axis, as denoted by construction line "Z", which passes through and is orthogonal with respect to rotary axis "B" of second shaft 14. As best seen in FIG. 4, apertures 42 are throughbores which include a stepped shoulder portion 44 formed between a smaller diameter first bore 46 and a larger diameter second bore 48. Legs 36 also include a series of upstanding lugs 49 formed adjacent to the edge of second bore 48. Alternatively, legs 36 can include an upstanding annular rim segment 49A formed adjacent to the edge of second bore 48, as shown in FIG. 4A. Again, lugs 49 and rim segment 49A are preferably formed to be generally concentric with trunion axis "Z" so as to surround second bore 48 of apertures 42. It should be noted that the shape and dimensions of apertures 28 and 42 can either be identical or different depending on the particular dimensions of cruciform 20 used therewith. It should also be noted that lugs 35 and 49 and/or annular rim segments 35A and 49A may be formed by machining, casting, or by similar technique.

Figure 1:
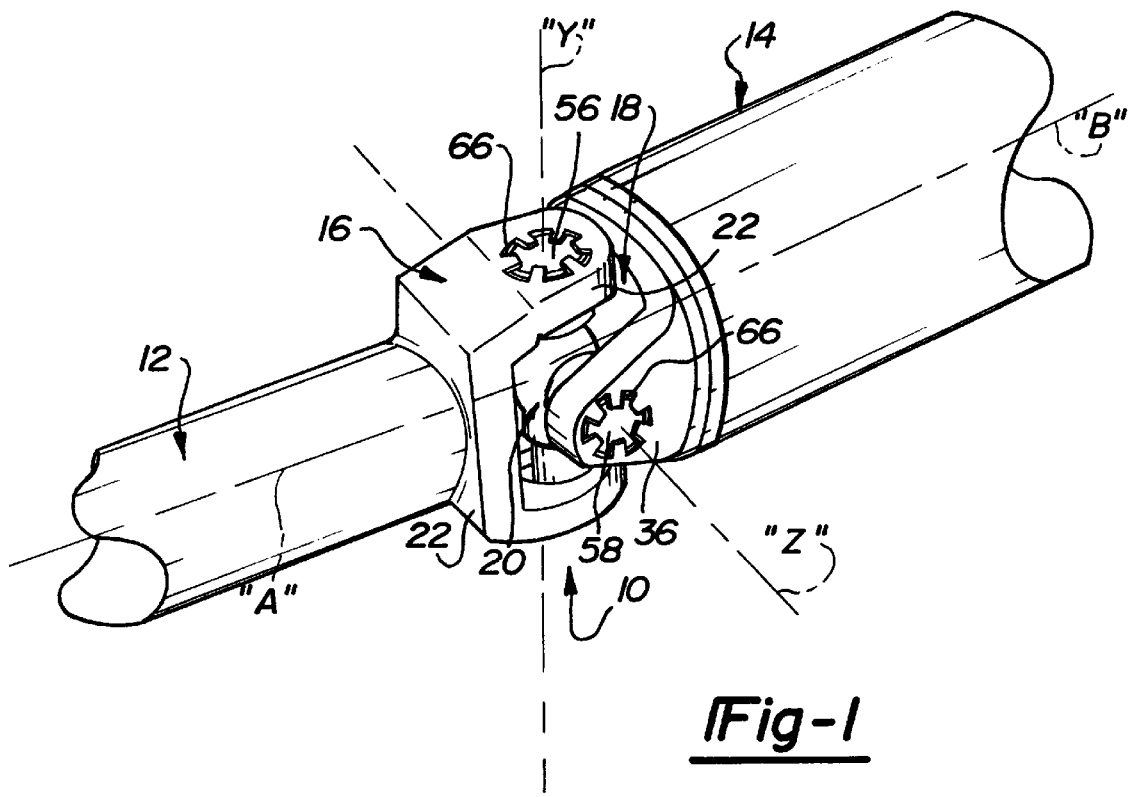
FIG. 1 is a perspective view of a universal joint according to the principles of the present invention.
Figure 2:
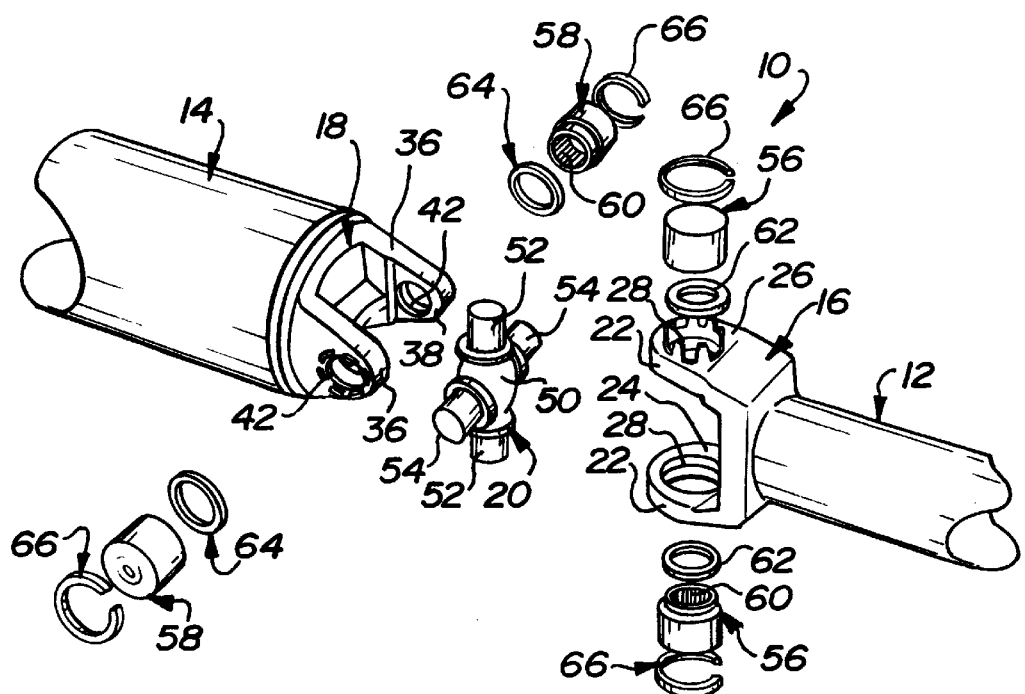
FIG. 2 is an exploded perspective view of the universal joint shown in FIG. 1.

As best seen in FIG. 2, cruciform 20 includes a central hub 50 from which a pair of first trunions 52 and a pair of second trunions 54 extend. First trunions 52 are orthogonal with respect to second trunions 54. First trunions 52 are adapted for insertion into apertures 28 in legs 22 of first yoke 16 so as to be axially aligned on first trunion axis "Y". Similarly, second trunions 54 are adapted to be inserted into apertures 42 in legs 36 of second yoke 18 so as to be axially aligned on second trunion axis "Z". With first trunions 52 and second trunions 54 installed respectively in first and second yokes 16 and 18, trunion axes "Y" and "Z" pass through a common plane which orthogonally intersects the rotary axis of cruciform 20, shown in FIGS. 5 and 6 by construction line "C". Universal joint 10 also includes a first pair of bearing cups 56 adapted to be mounted in apertures 28 and a second pair of bearing cups 58 adapted to be mounted in apertures 42. First bearing cups 56 are provided for receiving and rotatably supporting first trunions 52 in apertures 28. Similarly, second bearing cups 58 are provided for receiving and rotatably supporting second trunions 54 in apertures 42. As seen, bearing cup 56 and 58 each include a tubular sleeve segment enclosed by an end segment. A roller bearing assembly 60 is mounted in the sleeve segments for rotatably supporting trunions 52 and 54 therein. In addition, annular elastromeric seals 62,64 are mounted on trunions 52 and 54, respectively, for providing a sealed relationship with respect to the open end of the sleeve segments of bearing cups 56 and 58, respectively.

According to the present invention, a method is provided for aligning the rotary axis "A" of first shaft 12 with respect to the rotary axis "B" of second shaft 14 and subsequently fixing the cruciform 20 thereto. To this end, bearing cups 56 are mounted on first trunions 52 and bearing cups 58 are mounted on second trunions 54 prior to insertion thereof into their corresponding apertures 28 and 42 such that the terminal end surface of each trunion is placed in mating engagement with the bottom surface of its corresponding bearing cup. Alternatively, trunions 52 and 54 can be installed into corresponding apertures 28 and 42 with bearing cups 56 and 58 thereafter installed into apertures 28 and 42. For purposes of describing the cruciform alignment and retention method used in association with yokes 16 and 18, reference is now directed to FIGS. 5 through 7. However, while the following disclosure is specifically directed to retention of cruciform 20 relative to second yoke 18, it is to be understood that a similar process is contemplated for use with first yoke 16.

Figure 7:
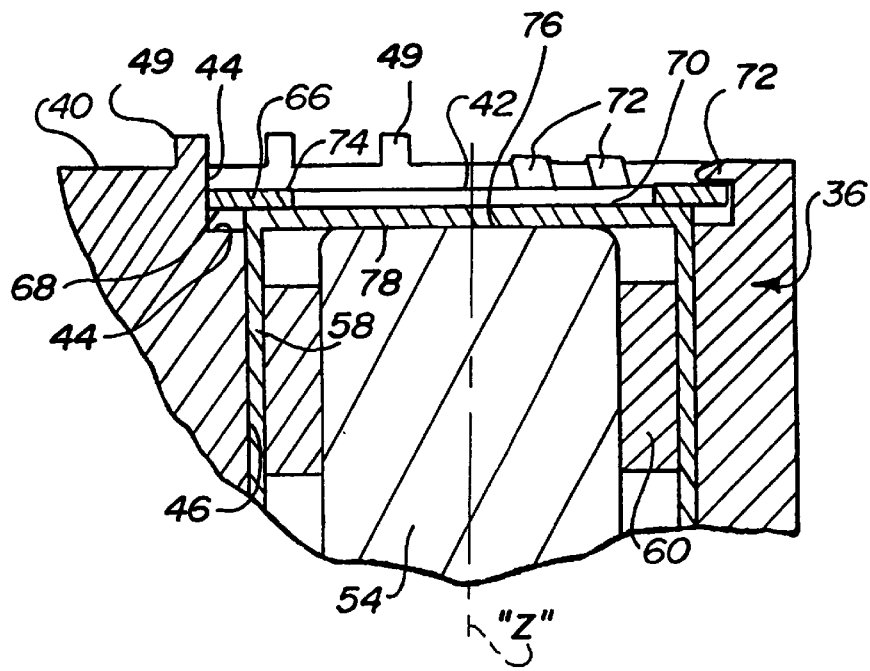
FIG. 7 is a partial sectional view of a universal joint taken generally along line A—A of FIG. 6.

Once rotary axis "A" of first shaft 12 is co-axially aligned with rotary axis "B" of second shaft 14, a retention member, preferably a resilient snap ring 66 is placed in second bore 48 of each aperture 42 such that its inner face surface 68 rests on outer surface 70 of bearing cup 58. As best seen from FIG. 7, most of the sleeve segment of bearing cup 58 is located within first bore 46 of aperture 42 with its end segment extending into second bore 48 of aperture 42. Thereafter, lugs 49 on legs 36 are deformed (i.e., staked, peened, rolled, etc.) to define a plurality of radial projections or retaining lugs 72 which overlap and engage an outer surface 74 of snap ring 66. The left-half of FIG. 7 shows lugs 49 prior to deformation while the right-half of FIG. 7 shows lugs 49 deformed to create retaining lugs 72. Such a deformation process causes a terminal end surface 76 of trunion 54 to engage, or be retained in close proximity to, an inner surface 78 of the end segment of bearing cup 58. Alternatively, if legs 36 include rim segments 49A (FIG. 4A), then the deformation process establishes a continuous retaining flange or lip which also overlaps and engages outer surface 74 of snap ring 66.

As a result of the alignment and retention method described above, a snap ring groove is effectively created in aperture 42 between shoulder 44 and retaining lugs 72. The axial position of this snap ring groove is independent of component tolerances such that cruciform 20 is fixed to second yoke 18 with the rotary axis "B" of second shaft 14 held in alignment with rotary axis "A" of first shaft 14. The deformation process for creating retaining lugs 72 (or the retaining flange) can be done simultaneously to both legs 36 or, alternatively, each leg 36 can be processed separately as long as the alignment and fixturing process functions to maintain co-axial alignment of rotary axis "C" relative to rotary axis "B". As is obvious, the method described for mounting bearing cups 58 and trunions 54 to second yoke 18 is also used for mounting bearing cups 56 and trunions 52 to first yoke 16 after rotary axis "A" of first shaft 12 has been co-axially aligned with rotary axis "B" of second shaft 14. In operation, either set of bearing cups can be secured prior to the other or, in the alternative, all four bearing cups can be simultaneously secured.

Figures 5, 6:
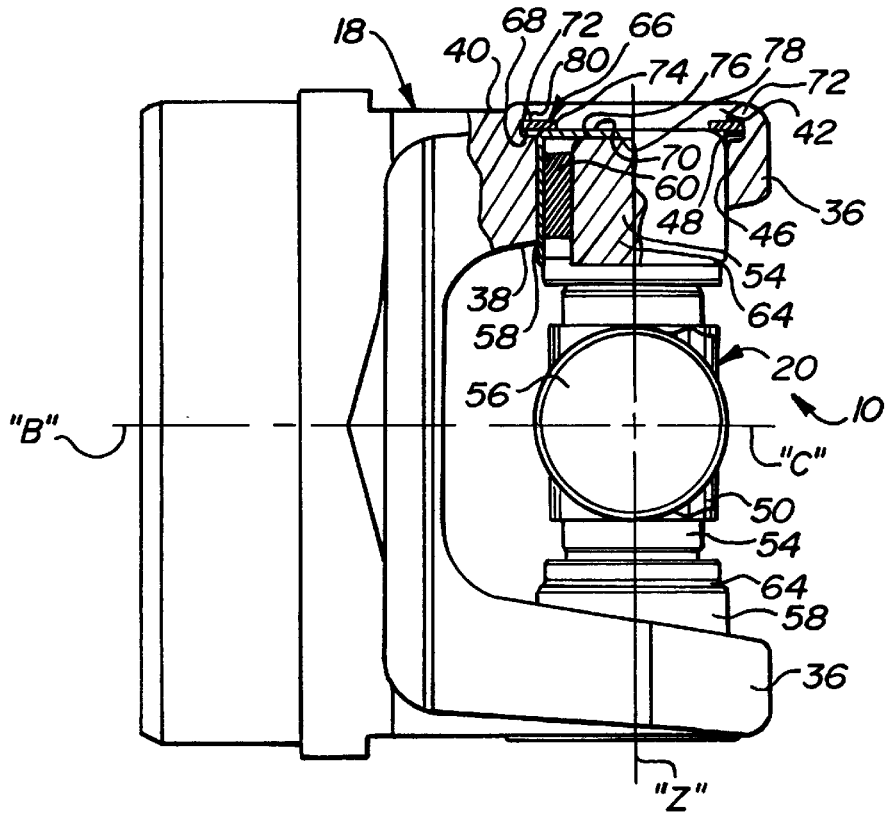
FIG. 5 is a side elevational view, partially in section with parts broken away for clarity, of the universal joint according to the present invention.
FIG. 6 is a top elevational view of the universal joint shown in FIG. 5.

With reference to FIG. 6, retaining lugs 72 are shown to define a retention aperture 80 having an "effective" diameter (shown in dashed line) which is greater than the diameter of first bore 46 and less than the diameter of second bore 48. To provide easy serviceability, snap ring 66 is elastically collapsible to allow removal from retention aperture 80. Similarly, since the effective diameter of retention aperture 80 is greater than that of first bore 46, bearing cups 58 may pass through retention aperture 80 following removal of snap ring 66, thereby providing an easily serviceable universal joint 10. Moreover, the method of the present invention provides a universal joint 10 which compensates for individual part tolerances since retaining lugs 72 (or retaining flange) are individually formed for each universal joint assembly 10. Therefore, dimensional variations which may exist (i.e., the length of trunions 52 and 54, the thickness of legs 22 and 36 respectively of yokes 16 and 18, the thickness of bearing cups 56 and 58, or any other elements) are accommodated during assembly of each universal joint. Furthermore, the method of the present invention allows cruciform 20 to adjust to variations in the machining of first yoke 16 and second yoke 18 in order to maintain the concentricity of rotary axis "A" and rotary axis "B".

Figure 8:
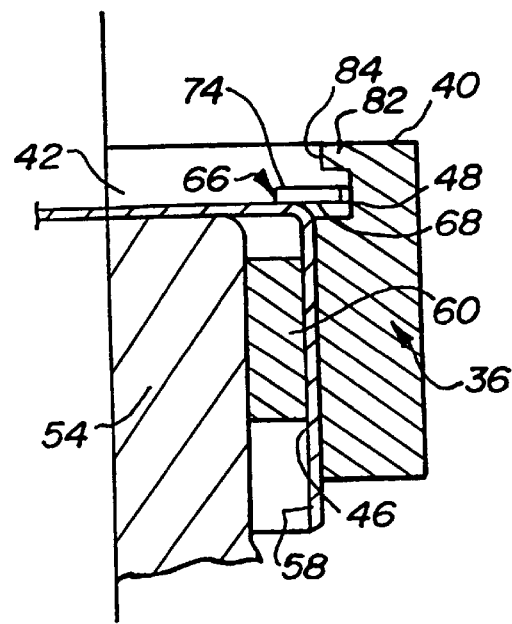
FIG. 8 and 9 are a partial sectional views of a universal joint according to an alternative embodiment of the present invention.
Figure 9:
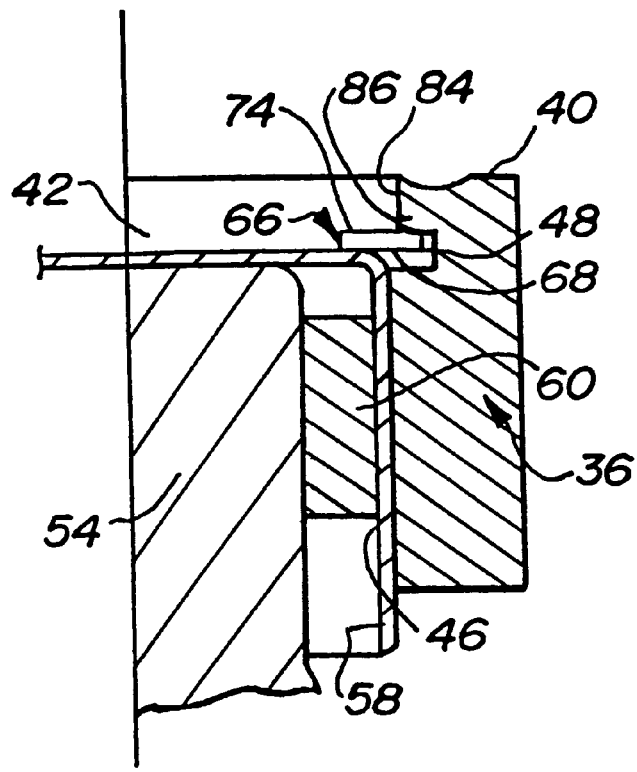

With reference to FIGS. 8 and 9, a second embodiment of the present invention is disclosed. In FIGS. 8 and 9, similar components are identified by the same reference numerals used to designate the components shown in FIGS. 1–7. Specifically, a radially extending flange 82 is now shown to surround the periphery of aperture 42 along outboard surface 40 of legs 36. Flange 82 defines a retention aperture 84 having a diameter that is greater in size than first bore 46 and less in size than second bore 48 for defining an annular snap ring groove into which scrap ring 66 is mounted. Thereafter, flange 82, or portions thereof, are deformed inwardly to define either a continuous projection or a series of dimpled projections 86 which engage outer face surface 74 of snap ring 66. In a manner substantially similar to that described above, cruciform 20 is fixed to first yoke 16 and second yoke 18 by forcing projection(s) 86 into contact with snap ring 66, while the rotary axis "A" of first shaft 12 is held in alignment with rotary axis "B" of second shaft 14. In order to maintain the concentricity of rotary axis "A" of first shaft 12 and rotary axis "B" of second shaft 14 while projections 86 are deformed into engagement with snap rings 66, it is preferable to form projections 86 on each leg of the yokes simultaneously. While not limited thereto, the projections can be formed by staking, orbital peening, or by other known deformation techniques.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A universal joint comprising:
   a yoke including a leg having an aperture extending therethrough, said aperture including a first bore immediately adjacent a second bore;
   a cruciform having a trunion;
   a bearing cup mounted on said trunion, said bearing cup having a sleeve segment located in said first bore of said aperture and an end segment located in said second bore of said aperture; and
   a retention member having first and second surfaces, said retention member disposed within said second bore of said aperture such that its first surface engages said end segment of said bearing cup; and wherein a portion of said leg adjacent to the end of said second bore is deformed to define a projection which engages said second surface of said retention member.

2. The universal joint of claim 1 wherein said portion of said leg deformed to define said projection includes a series of lugs extending outwardly from said leg adjacent to said second bore of said aperture.

3. The universal joint of claim 2 wherein said lugs are deformed such that said projections defines a series of radial retention lugs which engage said second surface of said retention member.

4. The universal joint of claim 1 wherein said portion of said leg deformed to define said projection is a wall surface surrounding said second bore of said aperture.

5. The universal joint of claim 4 wherein said projection is a continuous flange which engages said second surface of said retention member.

6. The universal joint of claim 4 wherein said projection is a series of dimpled projections which engage said second surface of said retention member.

7. The universal joint of claim 1 wherein said portion of said leg deformed to define said projection is an upstanding annular rim segment surrounding said second bore of said aperture.

8. The universal joint of claim 7 wherein said rim segment is deformed such that said projection includes a series of radial retention lugs which engage said second surface of said retention member.

9. The universal joint of claim 7 wherein said rim segment is deformed such that said projection is a continuous retention flange which engages said second surface of said retention member.

10. The universal joint of claim 1 wherein said projection defines a retention aperture which communicates with and is smaller than said second bore of said aperture.

11. The universal joint of claim 10 wherein said bearing cup has an outer diameter that is slightly smaller than an inner diameter of said first bore, and wherein said retention aperture has an inner diameter that is larger than said outer diameter of said bearing cup.

12. The universal joint of claim 10 wherein said retention member can be removed from a groove defined between said projection and said second bore and thereafter pass through said retention aperture.

13. The universal joint of claim 12 wherein said retention member is a snap ring.

14. The universal joint of claim 1 wherein said yoke includes a second leg laterally spaced from said first leg and having a second aperture that is aligned with said first aperture in said first leg, said second aperture having a first bore and a second bore, and wherein said cruciform includes a second trunion that is coaxial with said first trunion, and further comprising a second bearing cup mounted on said second trunion, said second bearing cup having a sleeve segment located in said first bore of said second aperture and an end segment located in said second bore of said second aperture, and a second retention member having first and second surfaces, said second retention member is disposed in said second bore of said second aperture such that its first surface engages said end segment of said second bearing cup, and wherein a portion of said second leg adjacent to said second bore of said second aperture is deformed to define a second projection engaging said second surface of said second retention member.

15. A method for assembling a universal joint, comprising the steps of:
providing a first rotary member adapted to be rotated about a first rotary axis, said first rotary member having a first yoke including a pair of first legs each having a first aperture extending therethrough, said first apertures each having a first bore immediately adjacent a second bore;
providing a second rotary member adapted to be rotated about a second rotary axis, said second rotary member having a second yoke including a pair of second legs each having a second aperture extending therethrough, said second apertures each having a first bore and a second bore;
providing a cruciform having a pair of first trunions and a pair of second trunions;
providing a pair of first bearing cups;
mounting said first bearing cups on said first trunions;
positioning said first bearing cups in said first bores of said first apertures such that end segments thereof extend into said second bores of said first apertures;
providing a pair of retention members each having first and second surfaces;
inserting said retention members into said second bores of said first apertures such that said first surface of said retention member engages said end segment of said first bearing cups;
aligning said first rotary axis of said first rotary member with respect to said second rotary axis of said second rotary member; and
deforming a portion of said first legs on said first yoke to define projections which extend into said second bores and engage said second surface of said retention members.

16. The method of claim 15 further comprising the steps of:
mounting a pair of second bearing cups on said pair of second trunions;
positioning said second bearing cups in said first bores of said second apertures such that end segments of said second bearing cups extend into said second bores of said second apertures;
inserting a second retention member having first and second surfaces into each of said second bores of said second apertures such that said first surface of said second retention member engages said end segment of said second bearing cups;
aligning said second rotary axis of said second rotary member with respect to said first rotary axis of said first rotary member; and
deforming a portion of said second legs on said second yoke to define projections which extend into said second bores and engage said second surface of said second retention members.

17. The method of claim 16 wherein a staking operation is employed in said deformations step.

18. The method of claim 17 wherein a peening operation is employed in said deformations step.

19. The method of claim 15 wherein each of said first legs includes a series of lugs located adjacent to said second bore of said first aperture, and wherein said deforming step includes deforming said lugs to define a series of radial retention lugs which engage said second surface of said retention member.

20. The method of claim 15 wherein each of said first legs includes an upstanding annular rim segment which surrounds said second bore of said first aperture, and wherein said deforming step includes deforming said rim segment to define a continuous retention flange which engages said second surface of said retention member.

21. The method of claim 15 wherein said projections define continuous flanges.

22. The method of claim 15 wherein said projections define a series of dimpled projections.

23. The method of claim 15 wherein said deformation step is performed sequentially for defining a projection on one of said first legs prior to the other of said first legs.

24. The method of claim 15 wherein said deformation step is performed to simultaneously define said projections on both of said first legs.

25. A universal joint comprising:
a first yoke adapted to be rotated about a first rotary axis, said first yoke including a pair of first legs each having a first throughbore defined by a first bore immediately adjacent a second bore;
a second yoke adapted to be rotated about a second rotary axis, said second yoke including a pair of second legs each having a second throughbore defined by a first bore and a second bore;
a cruciform having a pair of first trunions and a pair of second trunions;
a pair of first bearing cups mounted on said first trunions and positioned in said first bores of said first throughbores such that end segments thereof extend into said second bores;
a pair of second bearing cups mounted on said second trunions and positioned in said first bores of said second throughbores such that end segments thereof extend into said second bores; and
retention members positioned in said second bores of said first and second throughbores such that a first surface of said retention members engage said end segments of said first and second bearing cups;
wherein said rotary axis of said first yoke is aligned with respect to said rotary axis of said second yoke and a portion of said first and second legs are deformed to define projections which engage a second surface of said retention members.

26. The universal joint of claim 25 wherein said portion of said first and second legs deformed to define said projections includes a series of lugs extending outwardly from each of said first and second legs adjacent to said second bore.

27. The universal joint of claim 26 wherein said lugs are deformed such that said projections defines a series of radial retention lugs which engage said second surface of said retention member.

28. The universal joint of claim 25 wherein said portion of said first and second legs deformed to define said projections is a wall surface surrounding said second bore.

29. The universal joint of claim 28 wherein said projections are continuous flanges which engage said second surface of said retention members.

30. The universal joint of claim 28 wherein said projections are a series of dimpled projections which engage said second surface of said retention members.

31. The universal joint of claim 25 wherein said portion of said first and second legs deformed to define said projection is an upstanding annular rim segment surrounding said second bore.

32. The universal joint of claim 31 wherein said rim segment is deformed such that said projections includes a series of radial retention lugs which engage said second surface of said retention members.

33. The universal joint of claim 31 wherein said rim segment is deformed such that said projections define continuous retention flanges which engage said second surface of said retention members.

34. The universal joint of claim 25 wherein said projections defines a retention aperture which communicates with and is smaller than said second bore of said throughbores.

35. The universal joint of claim 34 wherein said bearing cups have an outer diameter that is slightly smaller than an inner diameter of said first bore, and wherein said retention aperture has an inner diameter that is larger than said outer diameter of said bearing cups.

36. The universal joint of claim 34 wherein said retention members can be removed from a groove defined between said projections and said second bore and thereafter pass through said retention aperture.

37. The universal joint of claim 36 wherein said retention member is a snap ring.

* * * * *